United States Patent Office 3,073,825
Patented Jan. 15, 1963

3,073,825
MANUFACTURING PROCESS FOR MELAMINE
Kiichiro Sugino and Kozo Shirai, both of Tokyo, Japan, assignors to Nippon Carbide Industries Co., Ltd., Tokyo, Japan, a corporation of Japan
No Drawing. Filed May 22, 1961, Ser. No. 111,493
Claims priority, application Japan Apr. 4, 1958
6 Claims. (Cl. 260—249.7)

This invention concerns a manufacturing process for melamine, characterized by condensing dicyandiamide or cyanamide with O-ethylisourea or O-methylisourea.

This application is a continuation-in-part of Serial No. 782,675, filed December 24, 1958, now abandoned.

Various processes have hitherto been used for the preparation of melamine. One of these processes was performed by heating dicyandiamide under atmospheric pressure in the presence of alkali. There are several improved processes, including a process for manufacturing melamine directly from calcium cyanamide, in which calcium cyanamide is used as raw material and the cyanamide constitutent is converted first into dicyandiamide and then melamine, followed by extraction of the resultant melamine with water. (Japanese Patents 170,177, 173,220). The process most generally used, however, is the so-called "high pressure process" wherein dicyandiamide is heated in liquid ammonia at about 200° C. under high pressure.

These processes have their own original characteristics. The former is easily performed without any high pressure equipment as in the latter. However, the disadvantage of low yield in the reaction cannot be avoided. In contrast, the high pressure process excels in that the yield of melamine is nearly quantitative. But this process also has some defects from the practical point of view. For example, melamine produced according to this process always contained a certain amount of impurities comprised chiefly of polymerized triazine, even when a raw material of the highest purity had been used. Therefore, these impurities had to be eliminated from the reaction product by methods which are extremely complicated.

To eliminate such complications, the inventors have carried out research aimed at obtaining melamine free of highly condensed triazines, which are by-produced in the reaction of dicyandiamide at high temperature and to find a rational manufacturing process since it is most desirable to obtain a process making it possible to produce melamine at lower temperatuare and pressure than before.

The present invention was one of the results achieved in the course of our research, and it was found that by heating dicyandiamide (or cyanamide) with O-alkylisourea the condensation by dealcoholation takes place readily and thus the reaction proceeds very smoothly at a relatively low temperature to produce melamine. These reactions are represented as follows:

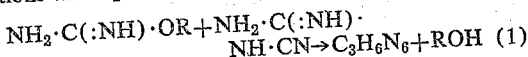

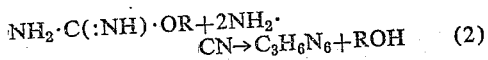

By using these reactions, dicyandiamide (or cyanamide) employed as raw material in the customary process can be almost quantitatively transformed into pure melamine without going through any troublesome process to purify the product. Even when an excess of the equivalent amount of dicyandiamide is used in the reaction 1, highly condensed triazines are not formed, differing from the reaction of dicyandiamide itself at the same temperature. When cyanamide is used instead of dicyandiamide, part of the former is easily converted to dicyandiamide by dimerization or by the reaction with O-alkylisourea, so reaction 1 also takes place simultaneously with reaction 2.

The formation of melamine by heating O-ethylisourea was suggested by McKee in the American Chemical Journal, Vol. 42, page 29 issued in 1909. However, a very low yield was recorded, so this reaction did not seeem to be quite practical. Unlike McKee's method which is a reaction of O-ethylisourea alone, our improved method is a condensation reaction of O-alkylisourea with dicyandiamide or cyanamide. This reaction produced greatly increased yield. Moreover, the melamine produced by this reaction did not contain any highly condensed triazines as described above.

It is desirable that these new reactions be carried out in non-aqueous medium, especially in ammonia, alcohols or in a mixture of ammonia and alcohols.

O-alkylisourea, which is a raw material in the present invention, can be prepared easily and quantitatively by the process wherein cyanamide is reacted with corresponding alcohol in the presence of a mineral acid, followed by neutralization of O-alkylisourea salt thus produced.

The aim of this invention is to prepare melamine by utilizing these new reactions, which are by no means reactions at high temperature or at high temperature plus pressure as the prior art, so that highly condensed triazines, which are difficult to be removed, are not at all by-produced. In this way, a product of high purity can be obtained directly. We have now established a novel melamine manufacturing process which has eliminated various defects which had hitherto existed in the known art.

In other words, we are quite sure that our invention will create a big revolution in the present melamine manufacturing process if O-ethyl or O-methylisourea is utilized as an auxiliary raw material.

Here are some examples to illustrate this invention.

*Example 1*

74.1 g. of O-methylisourea and 12.6 g. of dicyandiamide are added to 250 cc. of absolute ethanol and the mixture is heated at 70–80° C. for five hours under atmospheric pressure or in a sealed vessel while stirring continuously. Melamine is precipitated in colorless plate crystal which is separated from the mother liquor by filtration and washed with water. 14.1 g. of melamine is obtained. It is possible to produce melamine in sequence by repeating this reaction with successive addition of O-methylisourea and dicyandiamide.

*Example 2*

88.1 g. of O-ethylisourea and 12.6 g. of dicyandiamide are added to 250 cc. absolute ethanol and the mixture is treated like the foregoing example. 13.9 g. of melamine is obtained. To this mother liquor is added 29.2 g. of O-ethylisourea and the reaction is carried out as described above. As a result, 14.4 g. of melamine is obtained. In this case, the reaction can be repeated in similar fashion as the foregoing example.

*Example 3*

88.1 g. of O-ethylisourea and 84 g. of dicyandiamide are dissolved in 120 g. of liquid ammonia and the solution is heated at 80° C. for eight hours in a sealed vessel with stirring. Melamine precipitated is filtered and washed with water. Yield is 36 g. (M.P. 348° C). It is possible to produce melamine in sequence by repeating this reaction with successive addition of O-ethylisourea and dicyandiamide.

In the foregiong examples, if dicyandiamide alone is heated under the same conditions, nothing is obtained.

Example 4

88.1 g. of O-ethylisourea and 84 g. of dicyandiamide are dissolved in 180 g. of liquid ammonia and the solution is heated at 110–120° C. for eight hours in an autoclave while stirring continuously and the melamine precipitated is treated like the foregoing example. Yield is 76 g. (M.P. 350° C.). It is possible to produce melamine in sequence by repeating the reaction with successive addition of O-ethylisourea and dicyandiamide.

Example 5

74.1 g. of O-methylisourea and 84 g. of dicyandiamide are dissolved in 180 g. of liquid ammonia and the solution is heated at 120° C. for eight hours in an autoclave while stirring continuously. Melamine precipitated is treated like Example 3. Yield is 74 g. (M.P. 349° C.). It is possible to produce melamine in sequence by repeating the reaction with successive addition of O-methylisourea and dicyandiamide.

In the foregoing examples, the melamine produced is taken out at every charge of raw material to indicate the amount of melamine produced, but in the manufacturing process, it is advantageous to charge the raw material continuously and to take out the resultant melamine after a certain amount had been produced instead of taking out the produced melamine at every charge.

In the foregoing examples, the melamine produced contains no contaminants of highly condensed triazines, but contains a very small amount of the starting material which are easily removed by washing with water.

Example 6

88.1 g. of O-ethylisourea and 84 g. of dicyandiamide are dissolved in 120 g. of liquid ammonia and the solution is heated at 130° C. for eight hours in an autoclave while stirring continuously. Melamine is obtained in powder form. It is collected, washed with a diluted solution of sodium hydroxide and dried. Yield is 114 g. (M.P. 348° C.).

Example 7

74.1 g. of O-methylisourea and 84 g. of dicyandiamide are dissolved in 180 g. of liquid ammonia and the solution is heated at 130° C. for eight hours in an autoclave while stirring continuously, followed by treating the melamine as in Example 6. Yield is 106 g. (M.P. 349° C.).

Example 8

88.1 g. of O-ethylisourea and 84 g. of dicyandiamide are dissolved in 180 g. of liquid ammonia and the solution is heated at 150° C. for two hours in an autoclave while stirring continuously, followed by treating the melamine as in Example 6. Yield is 102 g. (M.P. 350° C.).

Example 9

74.1 g. of O-methylisourea and 84 g. of dicyandiamide are dissolved in 160 g. of liquid ammonia and the solution is heated at 150° C. for two hours in an autoclave while stirring continuously, followed by treating the melamine as in Example 6. Yield is 94 g. (M.P. 349° C.).

Example 10

88.1 g. of O-ethylisourea and 84 g. of dicyandiamide are dissolved in 120 g. of liquid ammonia and the solution is heated at 150° C. for five hours in an autoclave while stirring continuously, followed by treating the melamine as in Example 6. Yield is 114 g. (M.P. 350° C.).

Example 11

To a mixture of 200 cc. of absolute ethanol and 120 g. of ammonia, are added 88.1 g. of O-ethylisourea and 84 g. of dicyandiamide. The mixture is heated at 150° C. for six hours in an autoclave while stirring continuously, followed by treating the melamine as in Example 6. Yield is 112 g. (M.P. 350° C.).

Example 12

To a mixture of 100 cc. of absolute methanol and 125 g. of liquid ammonia, are added 74.1 g. of O-methylisourea and 84 g. of dicyandiamide. The mixture is heated at 150° C. for five hours in an autoclave while stirring continuously, followed by treating the melamine as in Example 6. Yield is 99 g. (M.P. 349° C.).

Example 13

To a mixture of 100 cc. of absolute methanol and 125 g. of liquid ammonia, are added 88.1 g. of O-ethylisourea and 84 g. of dicyandiamide. The mixture is heated at 150° C. for five hours in an autoclave while stirring continuously, followed by treating the melamine as in Example 6. Yield is 100 g. (M.P. 349° C.).

Example 14

88.1 g. of O-ethylisourea and 84 g. of cyanamide are dissolved in 120 g. of liquid ammonia and the solution is heated at 150° C. for five hours in an autoclave while stirring continuously, followed by treating the melamine as in Example 6. Yield is 99 g. (M.P. 350° C.).

Example 15

88.1 g. of O-ethylisourea and 84 g. of cyanamide are dissolved in a mixture of 120 g. of liquid ammonia and 160 g. of absolute ethanol and the mixture is heated at 150° C. for five hours in an autoclave while stirring continuously, followed by treating the melamine as in Example 6. Yield is 90 g. (M.P. 348° C.).

Example 16

44 g. of O-ethylisourea and 84 g. of dicyandiamide are dissolved in 120 g. of liquid ammonia and the solution is heated at 150° C. for three hours in an autoclave while stirring continuously, followed by treating the melamine as in Example 6. Yield is 89 g. (M.P. 349° C.).

Example 17

37 g. of O-methylisourea and 84 g. of dicyandiamide are dissolved in 140 g. of liquid ammonia and the solution is heated at 160° C. for two hours in an autoclave while stirring continuously, followed by treating the melamine as in Example 6. Yield is 96 g. (M.P. 349° C.).

Example 18

To a mixture of 120 cc. of absolute ethanol and 120 g. of liquid ammonia are added 44 g. of O-ethylisourea and 84 g. of dicyandiamide and the mixture is heated at 150° C. for five hours in an autoclave while stirring continuously, followed by treating the melamine as in Example 6. Yield is 76 g. (M.P. 349° C.).

Example 19

To a mixture of 160 cc. of absolute methanol and 120 g. of liquid ammonia, are added 37 g. of O-methylisourea and 84 g. of dicyandiamide and the mixture is heated at 150° C. for five hours in an autoclave while stirring continuously, followed by treating the melamine as in Example 6. Yield is 78 g. (M.P. 349° C.).

Example 20

To a mixture of 100 cc. of absolute methanol and 125 g. of liquid ammonia, are added 44 g. of O-ethylisourea and 84 g. of dicyandiamide and the mixture is heated at 150° C. for five hours in an autoclave while stirring continuously, followed by treating the melamine as in Example 6. Yield is 83 g. (M.P. 349° C.).

Example 21

88.1 g. of O-ethylisourea and 84 g. of dicyandiamide are dissolved in 60 g. of liquid ammonia and the solution is heated at 170° C. for two hours in an autoclave while stirring continuously, followed by treating the melamine as in Example 6. Yield is 112 g. (M.P. 349° C.).

*Example 22*

To a mixture of 100 cc. of absolute methanol and 125 g. of ammonia, are added 37 g. of O-methylisourea and 84 g. of dicyandiamide and the mixture is heated at 170° C. for three hours in an autoclave while stirring continuously, followed by treating the melamine as in Example 6. Yield is 87 g. (M.P. 348° C.).

In the foregoing examples, the melamine produced contains no contaminants of highly condensed triazines, but a small amount of cyanomelamine derivatives which can be easily removed by simple washing with a diluted solution of sodium hydroxide.

Having thus described the invention, what is claimed as new and desired to be secured by Letters Patent are:

1. A process for the manufacture of melamine which comprises condensing by heating a compound selected from the group consisting of dicyandiamide and cyanamide with a member selected from the group consisting of O-methylisourea and O-ethylisourea in at least one solvent selected from the group consisting of liquid ammonia, methanol and ethanol, and separating pure melamine from the condensation mixture.

2. A process as claimed in claim 1, wherein the molar ratio between said compound and said member is at least 1:1.

3. A process as claimed in claim 2, wherein said condensation is carried out at a temperature of between about 130–160° C.

4. A process for the manufacture of melamine, which comprises condensing by heating dicyanamide with a stoichiometric amount of a compound selected from the group consisting of O-methylisourea and O-ethylisourea in a solvent selected from the group consisting of liquid ammonia, methanol and ethanol and at a temperature of between about 130–160° C., and separating pure melamine from the condensation mixture.

5. A process for the manufacture of melamine, which comprises condensing by heating an at least stoichiometric amount of cyanamide with a compound selected from the group consisting of O-methylisourea and O-ethylisourea in liquid ammonia and at a temperature of between about 130–160° C., and separating pure melamine from the condensation mixture.

6. A process as in claim 5, wherein the molar ratio between said cyanamide and said compound is about 2:1.

References Cited in the file of this patent

UNITED STATES PATENTS 2,375,731    Caldwell et al.    May 8, 1945
2,884,437    Roberts    Apr. 28, 1959

OTHER REFERENCES

McKee: American Chemical Journal, vol. 42, page 29 (1909).

Smolin et al: "s-Triazines and Derivatives," pub. by Interscience Pub. Inc., N.Y., page 314 (February 1959)